(12) United States Patent
Chen

(10) Patent No.: US 12,513,757 B2
(45) Date of Patent: Dec. 30, 2025

(54) CONNECTION ESTABLISHMENT METHOD, APPARATUS, DEVICE, AND STORAGE MEDIUM

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 487 days.

(21) Appl. No.: 18/181,677

(22) Filed: Mar. 10, 2023

(65) Prior Publication Data

US 2023/0217512 A1    Jul. 6, 2023

Related U.S. Application Data

(63) Continuation of application No. PCT/CN2021/120763, filed on Sep. 26, 2021.

(30) Foreign Application Priority Data

Sep. 29, 2020   (CN) .......................... 202011053589.3

(51) Int. Cl.
*H04W 76/10* (2018.01)
*H04W 36/00* (2009.01)
(Continued)

(52) U.S. Cl.
CPC ........ *H04W 76/10* (2018.02); *H04W 36/0011* (2013.01); *H04W 36/0077* (2013.01);
(Continued)

(58) Field of Classification Search
CPC ............ H04W 76/10; H04W 36/0011; H04W 36/0077; H04W 36/00692;
(Continued)

(56) References Cited

U.S. PATENT DOCUMENTS

| 8,503,361 B2* | 8/2013 | Bienas | H04L 65/1073 |
| | | | 370/328 |
| 2015/0189574 A1* | 7/2015 | Ng | H04W 52/245 |
| | | | 370/254 |

(Continued)

FOREIGN PATENT DOCUMENTS

| CN | 101690345 A | 3/2010 |
| CN | 107493608 A | 12/2017 |

(Continued)

OTHER PUBLICATIONS

Varatharaajan, Sutharshun, Marcus Grossmann, and Giovanni Del Galdo. "5G new radio physical downlink control channel reliability enhancements for multiple transmission-reception-point communications." IEEE Access 10 (2022): 97394-97407. (Year: 2022).*

(Continued)

*Primary Examiner* — Sharad Rampuria
(74) *Attorney, Agent, or Firm* — Fredrikson & Byron, P.A.

(57) ABSTRACT

This application discloses a connection establishment method, apparatus, device, and storage medium. The method includes: receiving, by user equipment UE camp on or connected to a single frequency network SFN cell group, access-related information sent by a network-side device; and establishing a connection with a target cell based on the access-related information, where the target cell is a cell/TRP layer specific cell or transmission reception point.

16 Claims, 4 Drawing Sheets

(51) Int. Cl.
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
CPC ......... H04W 74/0836; H04W 74/0838; H04W 48/20; H04W 52/0251; H04W 74/006; H04W 74/0833; Y02D 30/70
See application file for complete search history.

(56) References Cited

U.S. PATENT DOCUMENTS

| | | | |
|---|---|---|---|
| 2017/0310718 A1* | 10/2017 | Kim | H04W 36/0058 |
| 2019/0394693 A1 | 12/2019 | Kim et al. | |
| 2020/0022041 A1 | 1/2020 | Ly et al. | |
| 2020/0045617 A1 | 2/2020 | Wei et al. | |
| 2020/0059967 A1 | 2/2020 | Kim et al. | |

FOREIGN PATENT DOCUMENTS

| | | |
|---|---|---|
| CN | 108024259 A | 5/2018 |
| CN | 109479236 A | 3/2019 |
| WO | 2020052425 A1 | 3/2020 |

OTHER PUBLICATIONS

International Patent Application No. PCT/CN2021/120763, International Search Report and Written Opinion with Partial English Machine Translation mailed Dec. 30, 2021, 8 pages.
International Patent Application No. PCT/CN2021/091865, International Search Report and Written Opinion with Partial English Machine Translation mailed Dec. 30, 2021, 8 pages.
CATT. "NR RACH Procedure" 3GPP TSG RAN WG1 Meeting #87 RI-1611375, Nov. 18, 2016 (Nov. 18, 2016), 4 pgs.
CATT, "Random Access Procedure in NR" , 3GPP TSG-RAN WG2 Meeting #96. Nov. 14, 2016, pp. 1-4.
CATT, "System Information Acquisition Procedure for Idle/Inactive UEs", 3GPP TSG RAN WG2 Meeting #95, Aug. 22, 2016, pp. 1-3.
Qualcomm Incorporated "Initial access and mobility procedures for NR unlicensed" , 3GPP TSG RAN WG1 Meeting #99, Nov. 18, 2019, pp. 1-13.
European Patent Office, "Extended European Search Report", From Application No. 21874401.9, Dated Jan. 22, 2024, pp. 1-11.

* cited by examiner

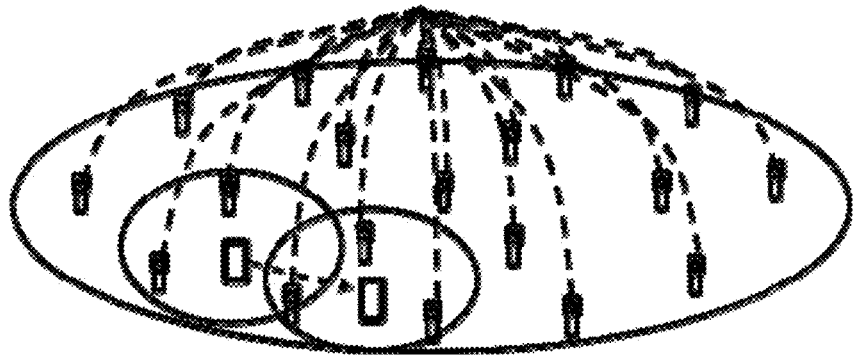
FIG. 4
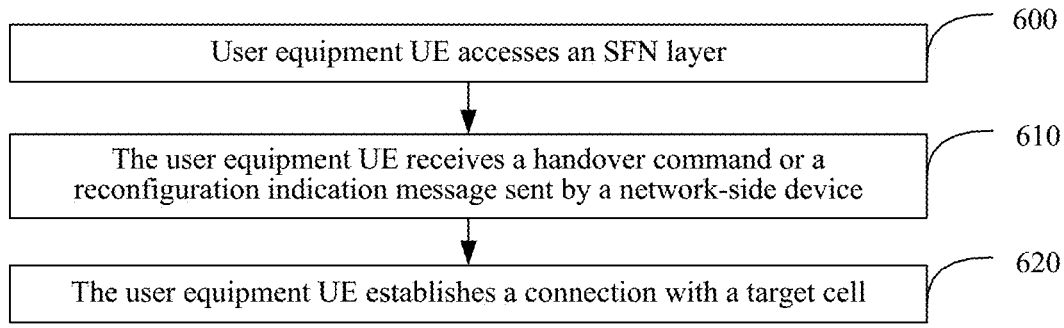
FIG. 5
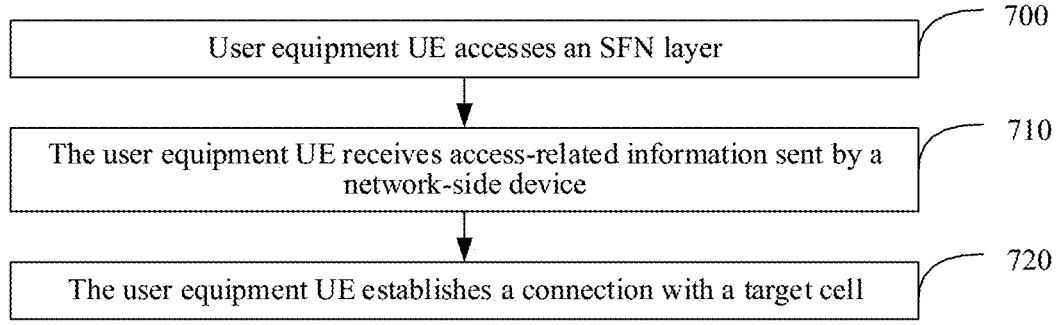
FIG. 6
FIG. 7

CONNECTION ESTABLISHMENT METHOD, APPARATUS, DEVICE, AND STORAGE MEDIUM

CROSS-REFERENCE TO RELATED APPLICATIONS

This application is a continuation of International Application No. PCT/CN2021/120763, filed on Sep. 26, 2021, which claims priority to Chinese Patent Application No. 202011053589.3, filed in China on Sep. 29, 2020, which are incorporated herein by reference in their entireties.

TECHNICAL FIELD

This application relates to the technical field of communications, and specifically, to a connection establishment method, apparatus, device, and storage medium.

BACKGROUND

Accompanied with the increasingly higher frequency band deployed in the future communication system, the coverage of one cell or transmission receiving point (TRP) becomes smaller; and in addition, the application scenarios supported by the mobile communication system become more diversified and include more high-speed scenarios; therefore, user equipment UE needs to frequently perform cell handover or cell reselection, which brings more terminal measurements; this is a great challenge to the power consumption of the user equipment UE.

To reduce the power consumption of the user equipment UE, a cell free or single frequency network SFN (single frequency Network) is to be a significant deployment scenario in a dense network or high-speed scenario. However, in the prior art, the user equipment UE is still camp on a cell layer/TRP layer when establishing a connection and is yet still camp on the cell layer cell/TRP layer when initiating a random access RACH or a connection establishment, which consumes an excessively high amount of power for the user equipment UE.

Therefore, how to propose a connection establishment method capable of enabling user equipment UE to save power has become an urgent problem to be solved.

SUMMARY

According to a first aspect of this application, a connection establishment method is provided. The method includes:
  receiving, by user equipment UE camp on or connected to a single frequency network SFN cell group, access-related information sent by a network-side device; and
  establishing a connection with a target cell based on the access-related information, where
  the target cell is a cell/TRP layer specific cell or transmission reception point.

According to a second aspect of this application, a connection establishment method is provided. The method includes:
  sending access-related information to user equipment UE camp on or connected to a single frequency network SFN cell group, where
  the access-related information is used for instructing the user equipment UE to establish a connection with a target cell; and
  the target cell is a cell/TRP layer specific cell or transmission reception point.

According to a third aspect of this application, a connection establishment apparatus is provided. The apparatus includes:
  a first receiving module, configured to receive, by user equipment UE camp on or connected to a single frequency network SFN cell group, access-related information sent by a network-side device; and
  a connection module, configured to establish a connection with a target cell based on the access-related information, where
  the target cell is a cell/TRP layer specific cell or transmission reception point.

According to a fourth aspect of this application, a connection establishment apparatus is provided. The apparatus includes:
  a first sending module, configured to send access-related information to user equipment UE camp on or connected to a single frequency network SFN cell group, where
  the access-related information is used for instructing the user equipment UE to establish a connection with a target cell; and
  the target cell is a cell/TRP layer specific cell or transmission reception point.

According to a fifth aspect of this application, a user equipment (UE) is provided, including a processor, a memory, and a program or instructions stored on the memory and executable by the processor, where the program or instructions, when executed by the processor, implement the steps of the connection establishment method according to the first aspect.

According to a sixth aspect of this application, a network-side device is provided, including a processor, a memory, and a program or instructions stored on the memory and executable by the processor, where the program or instructions, when executed by the processor, implement the steps of the connection establishment method according to the second aspect.

According to a seventh aspect of this application, a readable storage medium is provided. The readable storage medium stores a program or instructions, and the program or instructions, when executed by a processor, implements the steps of the connection establishment method according to the first aspect or second aspect.

According to an eighth aspect of this application, a program product is provided. The program product stored in a non-volatile readable storage medium, where the program product, when executed by a processor, implements the steps of the connection establishment method according to the first aspect or second aspect.

BRIEF DESCRIPTION OF THE DRAWINGS

FIG. 4 is a schematic diagram of an application scenario of a high frequency range and a low frequency range according to an embodiment of this application;

FIG. 5 is a schematic flowchart of another connection establishment method according to an embodiment of this application;

FIG. 6 is a schematic flowchart of still another connection establishment method according to an embodiment of this application;

FIG. 7 is a schematic flowchart of yet still another connection establishment method according to an embodiment of this application;

DETAILED DESCRIPTION

Figure 1:
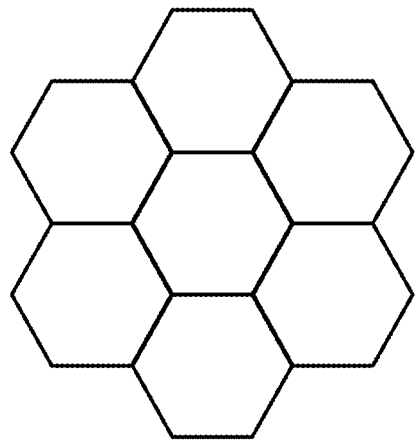
FIG. 1 is a schematic diagram of a single frequency network SFN cell group according to an embodiment of this application.

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It may be understood data used in such a way is interchangeable in proper circumstances, so that the embodiments of this application described herein can be implemented in other sequences than the sequence illustrated or described herein. In addition, "and/or" in this specification and the claims represents at least one of the connected objects, and the character "I" generally represents an "or" relationship between the associated objects.

It is worth noting that, the technologies described in the embodiments of this application are not limited to a long term evolution (LTE)/LTE-Advanced (LTE-A) system, and may further be applied to various wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. The terms "system" and "network" may usually be used interchangeably in the embodiments of this application. The technology described in this application can be applied to the systems and radio technologies mentioned above, and can also be applied to other systems and radio technologies. However, the following description describes a new radio (NR) system for example objectives, and NR terms are used in most of the description below, although these technologies are also applicable to applications other than NR system applications, such as a 6th generation (6G) communication system.

In the embodiments of this application, the user equipment UE may also be referred to as a terminal or user equipment or a user terminal (User Equipment, UE). The user equipment UE may be a terminal-side device such as a mobile phone, a tablet computer, a laptop computer or referred to as a notebook computer, a personal digital assistant (PDA), a palm computer, a netbook, an ultra-mobile personal computer (UMPC), a mobile Internet device (MID), a wearable device (Wearable Device) or in-vehicle equipment (VUE), or a pedestrian terminal (PUE). The wearable device includes: a bracelet, a headphone, glasses, or the like. It should be noted that the embodiments of this application are not limited to the specific type of the terminal. The network-side device may be a base station, where the base station may be referred to as a node B, an evolved node B, an access point, a base transceiver station (BTS), a radio base station, a radio transceiver, a basic service set (BSS), an extended service set (ESS), a B node, an evolved B node (eNB), a home B node, a home evolved B node, a WLAN access point, a Wi-Fi node, a transmitting receiving point (TRP) or other suitable term in the field, as long as the same technical effect is achieved, the base station is not limited to specific technical vocabularies, and it should be noted that, in the embodiments of this application, a base station in the NR system is used as an example only and the specific type of the base station is not limited.

To better understand the solution provided in this application, the following contents are described first as follows:

1. Introduction of Single Frequency Network (Single Frequency Network, SFN).

A single frequency network SFN transmission scheme means that a plurality of cells or a plurality of transmitting points send a same signal, there is no co-frequency interference between different cells, and a plurality of signals can improve a signal to interference plus noise ratio (SINR), transmission quality, and coverage effect.

FIG. 1 is a schematic diagram of a single frequency network SFN cell group according to an embodiment of this application. FIG. 1 illustrates a single frequency network SFN cell group super cell constructed by seven cells.

It may be understood that the plurality of cells that construct the single frequency network SFN cell group may share one cell ID, that is, an ID of the super cell. The plurality of cells may send signals through SFN transmission. For example, each cell performs sending by using a wide beam, and user equipment UE may receive wide beams sent by plurality of cells at a particular time, so as to obtain a diversity gain. In the SFN transmission scheme, the user equipment UE does not need to frequently perform related operations of cell reselection or handover between the cells.

2. Mobility of User Equipment UE in an Idle State/Inactive State.

For the user equipment UE in the idle state or the inactive state, during movement, a network provides priorities of frequencies.

For a co-frequency neighbor cell, a measurement evaluation value of a target cell or a neighbor cell is obtained through calculation after adding an offset according to a measurement result of the target cell or the neighbor cell, and a measurement evaluation value of a serving cell is obtained through calculation after adding an offset according to the measurement result of the serving cell.

If it is determined that the measurement evaluation value of the target cell or the neighbor cell is better than the measurement evaluation value of the serving cell, a duration exceeds a first preset duration, for example, a duration configured by the network, and a period of time for which the user equipment UE is camp on the current serving cell exceeds a second preset duration, for example, the second preset duration is 1 s as stipulated in a protocol, the user equipment UE reselects the target cell or the neighbor cell.

For a high-priority inter-frequency (inter-frequency) or inter-RAT (inter-RAT) neighbor cell, if the measurement evaluation value of the target cell or the neighbor cell exceeds a first preset threshold and the duration exceeds a third preset duration, for example, a duration configured by the network, the user equipment UE reselects the target cell or the neighbor cell.

For a low-priority inter-frequency (inter-frequency) or inter-RAT (inter-RAT) neighbor cell, if the measurement evaluation value of the target cell or the neighbor cell is greater than a second preset threshold, the measurement evaluation value of the current serving cell is less than a second threshold, and the duration exceeds a fourth preset duration, for example, a duration configured by the network, the user equipment UE reselects the target cell or the neighbor cell.

For an inter-frequency (inter-frequency) or inter-RAT (inter-RAT) neighbor cell, in a case that a frequency priority of the target cell or the neighbor cell is the same as that of the current serving or resident cell, the cell reselection method is the same as that of the co-frequency cell.

The user equipment UE in the idle state Idle or Inactive state may trigger a connection establishment process by receiving a paging message sent by the network-side device, so as to send and receive data.

3. Introduction of Separation of a Centralized Control Unit (CU) and a Distributed Unit (DU).

In a 5G system, for a base station gNB, protocol stack entities may be placed on different control units, respectively. For example, radio resource control (RRC) and packet data convergence protocol (PDCP) are placed on the CU, and radio link control (RLC) and Media Access Control (MAC)/Port Physical Layer (PHY) are placed on the DU. The CU and the DU have particular management permissions of radio resources. For example, the CU may manage a cell connected thereto through an RRC message, and the DU may manage a cell connected thereto through a MAC CE message. A plurality of DUs are connected to one CU, and the CU is connected to a core network and another CU.

4. Basic Process for a Terminal to Access a System.
   (1) Initial search: including synchronization of synchronization signal blocks (SSB) and receiving of system information. Alternatively, primary synchronization information (PSS) may be received first, then a secondary synchronization signal (SSS) may be received, and then a physical broadcast channel (PBCH) may be received: an SSB index, and information in a PBCH RMRS and a master information block (MIB) are obtained.
   (2) Further receive, based on the obtained information, broadcast system information (SI), including information required for accessing the system.
   (3) Perform random access based on the obtained information required for accessing the system.

5. Random Access (RACH) Process.

Current RACH processes are grouped into contention random access and contention-free random access processes.

Figure 2:
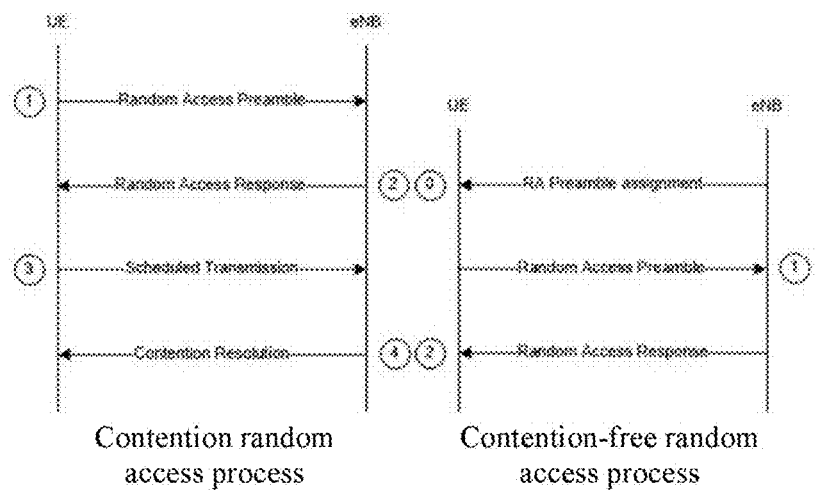
FIG. 2 is a schematic flowchart of a random access process according to an embodiment of this application.

FIG. 2 is a schematic flowchart of a random access process according to an embodiment of this application. As shown in FIG. 2, a contention random access process includes Message1-Message4 four-step access, and a contention-free random access process includes Message1-Message2 two-step access.

The Message2 in both the contention random access and the contention-free random access is used for sending a random access response (RAR). UE listens for an RAR corresponding to a random access radio network temporary identity (RA-RNTI) in an RAR window.

Due to the problem that user equipment UE sends a same preamble on a same PRACH (Physical Random Access Channel) resource in the contention random access, the Message3 may be sent according to a UL grant in the Message2 after the Message2 is received, the user equipment UE may carry a UE identity in the Message3, and a contention resolution timer may be started simultaneously when the Message3 is sent. If the Message4 sent by a base station is received before the contention resolution timer expires, the UE contention resolution is successful. The base station may carry a UE identity in the Message4. After receiving the Message4, the user equipment UE may determine, based on the UE identity carried therein, whether the Message4 is the Message4 of the UE, so as to determine whether the UE is successful in contention.

Further, to shorten a latency for accessing the system, 2-step RACH may be used, that is, a RACH process including two steps: respectively, user equipment UE sends a MessageA to a network-side device and then receives a MessageB issued by the network-side device. The MessageA includes functions of the foregoing Message1 or Message1 and Message3, and the MessageB includes functions of the foregoing Message2 or Message2 and Message4.

6. Reception of Paging Message.

In an LTE (Long Term Evolution, long term evolution) or NR (New Radio, new radio) system, to save the power consumption of UE, DRX (DiscontinuousReception) cycles may be introduced. User equipment UE may monitor a PDCCH (Physical Downlink Control Channel) at a location corresponding to a PF (Paging Frame) and PO (Paging occasion) calculated according to a terminal identity and a plurality of configurations of a network-side device, so as to receive a paging message on a resource indicated by the PDCCH. The terminal identity may be an IMSI (International Mobile Subscriber Identity, international mobile subscriber identity) in the LTE, and may be a 5G-S-TMSI in the NR.

When the user equipment UE is in an idle state, since the network does not know a particular location of the UE, when the core network needs to page the user equipment UE, a paging message may be sent to the UE through all base stations within a particular coverage, for example, all base stations in a particular area less than or equal to a tracking area.

A connection establishment method provided in the embodiments of this application is described below through specific embodiments and application scenarios thereof with reference to the accompanying drawings.

Figure 3:
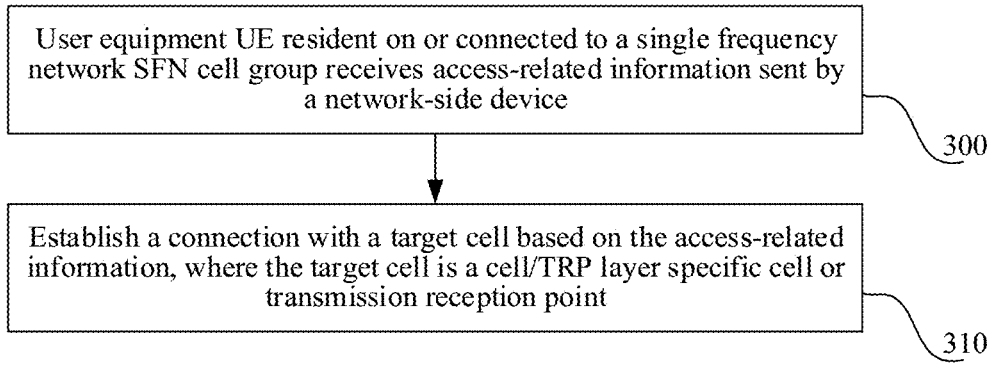
FIG. 3 is a schematic flowchart of a connection establishment method according to an embodiment of this application.

FIG. 3 is a schematic flowchart of a connection establishment method according to an embodiment of this application. As shown in FIG. 3, the method includes the following steps:

Step 300: User equipment UE camp on or connected to a single frequency network SFN cell group receives access-related information sent by a network-side device.

Step 310: Establish a connection with a target cell based on the access-related information, where
the target cell is a cell/TRP layer specific cell or transmission reception point.

Alternatively, in an actual deployment, an SFN is a coverage of a super cell, which includes a plurality of cells or TRPs. Generally, an SFN super cell is referred to as an SFN layer. A cell corresponding to the super cell or the SFN layer is an SFN specific cell. Moreover, a plurality of cells or TRPs included in an SFN coverage are a cell/TRP layer. The cell/TRP corresponding to this layer is a cell/TRP layer specific cell or TRP. That the user equipment UE is camp on or accesses the SFN or the SFN layer means that the user equipment UE is camp on or accesses an SFN specific cell; and that the user equipment UE is camp on or accesses the cell/TRP or the cell/TRP layer means that the user equipment UE is camp on or accesses a cell/TRP layer specific cell. That the user equipment UE initiates connection establishment or RACH to the SFN or the SFN layer means that the user equipment initiates establishment or RACH to the SFN specific cell; and that the user equipment UE initiates connection establishment or RACH to the cell/TRP layer or cell/TRP means that the user equipment initiates establishment or RACH to the cell/TRP layer specific cell. Correspondingly, a reference signal (RS), system message (SI), paging message (paging), or the like on the SFN layer are all referred to as an SFN specific RS, SI, paging, or the like. An RS, SI, paging, or the like on the cell/TRP layer are all referred to as a cell/TRP layer specific RS, SI, paging, or the like.

First, Some of the Terms are Explained:
Cell/TRP layer specific: A relevant configuration corresponding to each cell/TRP is independent. Configurations in the cell/TRP coverage are the same.
SFN/super cell specific: A relevant configuration corresponding to each SFN or super cell is independent. Configurations in the SFN coverage or the super cell coverage are the same.

It should be noted that the reference signal may be an SSB, namely, an SSB specific SFN and a cell/TRP layer specific SSB, and the reference signal may also be various reference signals such as a channel-state information reference signal (CSI-RS), a cell reference signal (CRS), a sounding reference signal (SRS), and a demodulation reference signal (DMRS).

Alternatively, since user equipment UE is camp on a cell/TRP layer when initiating random access or connection establishment in the prior art, the user equipment UE is also on the cell/TRP layer when initiating RACH or connection establishment. The SFN layer cannot be effectively used for residence or connection establishment to achieve the purpose of saving power for the user equipment UE, and as a result the user equipment UE is quite power-consuming.

Therefore, in this embodiment, the user equipment UE may be camp on the single frequency network cell group when the user equipment UE is in an idle state Idle or Inactive state, and access the target cell when the user equipment UE is about to enter a connected state or has accessed the SFN layer or is in a process of establishing a connection with the SFN layer.

Alternatively, the user equipment UE may directly obtain access-related information for establishing a connection with the target cell from the network-side device when the user equipment UE is about to enter a connected state or has accessed the SFN layer or is in a process of establishing a connection with the SFN layer. In this embodiment, the access-related information may be any information or combination capable of providing an access resource for the user equipment UE, such as a physical layer cell identity PCI of the target cell, a synchronization raster of the target cell, a reference signal of the target cell, and a random access RACH resource correlated with the reference signal of the target cell, for example, a preamble configuration, a random access occasion (Rach occasion, RO) resource, or a resource for randomly accessing another time domain, frequency domain, or code domain.

After obtaining the access-related information, the user equipment UE may establish a connection with the target cell based on the access-related information.

In this embodiment, the target cell may be a cell or a transmission reception point TRP within the SFN coverage, or may be a cell or a transmission reception point TRP outside the SFN coverage, which is not limited in this embodiment.

In the embodiments of this application, when user equipment UE camp on or connected to a single frequency network SFN cell group needs to establish a connection with a target cell, the user equipment UE directly obtains access-related information for establishing the connection with the target cell from a network-side device and then establishes the connection with the target cell. Compared with the prior art in which the user equipment UE is camp on a cell/TRP to initiate a random access or establish a connection, frequent cell measurements and cell handover of the user equipment UE are avoided, thereby effectively reducing the power consumption of the user equipment UE and reducing the network overhead.

Optionally, based on any of the foregoing embodiments, before or when the user equipment UE camp on the SFN cell group establishes the connection with the target cell, the access-related information includes at least one of the following:
a physical layer cell identity PCI of the target cell;
a synchronization raster of the target cell;
a reference signal of the target cell; or
a random access RACH resource correlated with a reference signal of the target cell.

Alternatively, in a case that the user equipment UE camp on the SFN layer is about to access the SFN layer but has not accessed, that is, when the user equipment UE camp on the SFN cell group establishes a connection with the target cell, the connection may be directly established with the target cell; or the access-related information sent by the network-side device may be received, and the connection may be established with the target cell based on the access-related information.

Alternatively, before the user equipment UE camp on the SFN layer establishes a connection with the target cell, the access-related information sent by the network-side device may be received and the connection with the target cell is established based on the access-related information, where the access-related information may include at least one of the following:
a physical layer cell identity PCI of the target cell, namely, a cell/TRP layer specific PCI;
a synchronization raster of the target cell, namely, a cell/TRP layer specific Sync raster;
a reference signal of the target cell, which may be cell/TRP layer specific SSB related information, for example, an SSB number, an SMTC, or the like; or
a random access RACH resource correlated with the reference signal of the target cell, for example, a preamble configuration, a random access occasion (Rach occasion, RO) resource, or a resource for randomly accessing another time domain, frequency domain, or code domain.

In this embodiment, the user equipment UE needs to perform a cell selection or reselection operation before initiating the random access. The user equipment UE initiates RACH random access or connection establishment on the selected/reselected target cell/TRP.

Optionally, based on any of the foregoing embodiments, the access-related information is indicated by at least one of the following:
 an SFN specific system information SI indication;
 a system information SI indication of the target cell; or
 a reference signal indication of the target cell.

Alternatively, when obtaining the access-related information, the user equipment UE may first obtain at least one of the following: SFN specific system information SI, system information SI of the target cell, or a reference signal of the target cell; and then obtain the access-related information based on at least one of the foregoing indications.

For example, the user equipment UE may first obtain reference information of the target cell, obtain a PCI of the target cell based on the reference signal of the target cell, further obtain system information SI of the target cell based on the PCI of the target cell, and finally obtain a random access RACH resource correlated with the reference signal of the target cell; and a connection with the target cell is established based on the RACH resource.

For example, the user equipment UE may first obtain the cell/TRP layer specific SI of the target cell, and further obtain an RACH resource associated with the cell/TRP layer specific SSB of the target cell.

Alternatively, in this embodiment, the system information SI of the SFN may indicate any one, any two, or all of three types of access-related information: a physical layer cell identity PCI of the target cell, namely, a cell/TRP layer specific PCI, a synchronization raster of the target cell, namely, a cell/TRP layer specific Sync raster, and a synchronization signal block SSB-related information of the target cell, namely, a cell/TRP layer specific SSB related information. It may be understood that in a case that the system information SI corresponding to the single frequency cell group indicates only part of the access-related information, access-related information that is not indicated can be obtained through blind detection by the user equipment UE.

In this embodiment, the cell/TRP layer specific SSB related information of the target cell may be an SSB number, an SMTC, or the like.

Optionally, based on any of the foregoing embodiments, the method further includes:
 when or before the user equipment UE camp on the SFN cell group establishes the connection with the target cell, receiving at least one of the following:
 a reference signal of the target cell; or
 a system information SI corresponding to the target cell.

Alternatively, in this embodiment, because the access-related information can be indicated by the system information SI of the target cell or the reference signal of the target cell, the user equipment UE that is about to establish a connection with the target cell or before the connection is established may first receive a system information SI indication of the target cell or the reference signal of the target cell sent by the network-side device, further obtain the access-related information, and establish the connection with the target cell.

Optionally, based on any of the foregoing embodiments, in a process during which the user equipment UE camp on the SFN cell group establishes the connection with the SFN cell group, or after the user equipment UE establishes the connection with the SFN, the receiving the access-related information sent by the network-side device includes:
 receiving a handover command or a reconfiguration indication message sent by the network-side device and obtaining the access-related information based on the handover command or the reconfiguration indication message.

Alternatively, in the process during which the user equipment UE camp on the SFN layer establishes the connection with the SFN layer, or after the user equipment UE has accessed the SFN layer, the user equipment UE may access the target cell/TRP of the cell/TRP layer based on an indication of the network-side device.

Alternatively, in the process during which the user equipment UE camp on the SFN layer establishes the connection with the SFN layer, or after the user equipment UE has accessed the SFN layer, the network-side device may send to the user equipment UE a handover command or a reconfiguration indication message, which is used for instructing the user equipment UE to transfer to be connected to the target cell/TRP of the cell/TRP layer.

It may be understood that the handover command or the reconfiguration indication message includes access-related information for the user equipment UE to establish the connection with the target cell, for example, system information SI of the target cell or a random access RACH resource correlated with a reference signal of the target cell. The user equipment UE may then be connected to the target cell/TRP based on the access-related information.

In an implementation, the handover command or the reconfiguration indication message may be a synchronous reconfiguration (reconfiguration with sync or handover command or mobility control information). In other words, an indication message sent by the network-side device to the user equipment UE instructs the user equipment UE to perform a handover operation or to switch a cell.

Optionally, based on any of the foregoing embodiments, in a process during which the user equipment UE camp on the SFN cell group establishes the connection with the SFN cell group, the receiving the access-related information sent by the network-side device includes:
 receiving a random access-related message sent by the network-side device, where the random access-related message carries the access-related information; and
 the random access-related message includes: a Message2 in a contention-free random access process, or a Message2 or a Message4 in a contention random access process, or a MessageB in a two-step random access RACH process.

Alternatively, in the process during which the user equipment UE camp on the SFN cell group establishes the connection with the SFN layer, when sending, to the user equipment UE, the random access-related information, the network-side device may add the access-related information, which is used for instructing the user equipment UE to transfer to be connected to the target cell/TRP of the cell/TRP layer during the process of establishing the connection with the SFN layer.

Alternatively, when accessing the SFN layer, the user equipment UE may initiate an RACH through an SFN specific RACH resource. After sending a random access request, the user equipment UE may receive random access-related information returned by the network-side device. The random access-related information carries a handover command or a reconfiguration indication message, where the handover command or the reconfiguration indication message includes access-related information, used for instructing the user equipment UE to transfer to be connected to the target cell/TRP of the cell/TRP layer. After receiving the handover command or the reconfiguration indication message, the user equipment UE transfers to be connected to the target cell/TRP of the cell/TRP layer to complete the connection establishment.

In this embodiment of this application, when user equipment UE camp on a single frequency network cell group needs to establish a connection with a target cell, the user equipment UE directly obtains access-related information for establishing the connection with the target cell by using a random access-related message in a process of establishing a connection with an SFN layer, which further saves the power consumption of the user equipment UE and saves the network overhead while avoiding frequent cell measurements of the user equipment UE.

Optionally, based on any of the foregoing embodiments, the connection with the SFN is established based on a random access RACH resource associated with an SFN specific reference signal.

Alternatively, in the process during which the user equipment UE camp on the SFN layer establishes a connection with the SFN layer, or when the user equipment UE that has accessed the SFN layer establishes a connection with the SFN layer or initiates a random access, the connection is established based on a random access RACH resource associated with an SFN specific reference signal.

Optionally, based on any of the foregoing embodiments, the method further includes: before the user equipment UE establishes the connection with the SFN, obtaining the random access RACH resource from SFN specific system information SI or cell/TRP layer specific system information SI.

Alternatively, before establishing the connection based on the random access RACH resource associated with the SFN specific reference signal, the user equipment UE may first obtain, from the SFN specific SI or the cell/TRP layer specific SI, the RACH resource associated with the SFN specific SSB, and establish the connection with the SFN layer based on the random access RACH resource.

Optionally, based on any of the foregoing embodiments, the establishing the connection with the target cell includes: initiating an RRC connection establishment or RACH process in the target cell.

Alternatively, after obtaining the access-related information, the user equipment UE may initiate the RRC connection establishment or RACH process in the target cell based on the access-related information. The target cell may be a cell/TRP within an SFN coverage currently camp on or accessed, or may be a cell/TRP outside an SFN coverage currently camp on or accessed. In other words, the target cell may pertain to the current SFN, or another SFN, or may not pertain to any SFN.

Optionally, based on any of the foregoing embodiments, after the user equipment UE establishes the connection with the SFN, the access-related information includes target data link information; and the establishing the connection with the target cell based on the access-related information includes: sending and receiving all or part of service data of the user equipment UE through the target cell based on the target data link information.

Alternatively, after the user equipment UE camp on the SFN layer has successfully accessed the SFN layer, in a case that there is a need for data transmission with the target cell, all or part of service data may be sent and received through the target cell based on an indication of the network-side device.

Alternatively, when the user equipment UE camp on the SFN layer has successfully accessed the SFN layer, the user equipment UE may receive the access-related information, which may be target data link information, sent by the network-side device. After receiving the access-related information, the user equipment UE may send and receive all or part of the service data through the target cell based on the target data link information.

Alternatively, that all or part of the service data is sent and received through the target cell may include configuring the target cell as a secondary cell group (Secondary cell group, SCG) of a currently connected cell or as a secondary cell (Secondary cell, Scell) of a currently connected cell. Alternatively, a plurality of prior protocol layers may be split (split) to the target cell. The prior protocol layers include at least one of the following: RRC, SDAP, PDCP, RLC, MAC, or PHY.

Optionally, based on any of the foregoing embodiments, in a case that the user equipment UE is camp on the SFN cell group, the method further includes:
when the user equipment UE switches between different cells/TRPs within an SFN coverage, not performing cell selection or reselection or not performing cell handover.

Alternatively, when the user equipment UE switches between different cells/TRP within the SFN coverage, a related operation of cell reselection or handover does not need to be frequently performed between cells, and therefore frequent cell measurements can be avoided, thereby effectively reducing the energy consumption of the user equipment UE, and in addition signaling interactions during the establishment of the connection with the target cell are reduced, thereby saving the network overhead.

Optionally, based on any of the foregoing embodiments, the method further includes:
in a case that the user equipment UE is in an inactive state or an idle state, the user equipment UE is camp on the SFN cell group and distinguishes a cell/TRP layer specific cell and an SFN specific cell based on at least one of the following:
a physical layer cell identity PCI; or
a synchronization raster.

Alternatively, to enable the user equipment UE to effectively reduce the energy consumption, when the user equipment UE is in an idle state Idle or Inactive state, the user equipment UE may be camp on the SFN layer.

In this embodiment, when user equipment UE that supports an SFN feature is in an idle or inactive state, the user equipment UE may selects to be camp on the SFN layer. When user equipment UE that does not support an SFN feature is in an idle or inactive state, the user equipment UE selects to be camp on the cell/TRP layer.

Therefore, the user equipment UE may distinguish the SFN layer and the cell/TRP layer based on the cell identity PCI and/or the synchronization raster.

For example, an SFN specific cell identity PCI or specific synchronization raster may be set to distinguish the SFN and the cell/TRP. The user equipment UE may determine that the resident cell is the SFN layer based on the SFN specific cell identity PCI or specific synchronization raster.

Optionally, based on any of the foregoing embodiments, in a case that the user equipment UE is camp on the SFN cell group, the method further includes at least one of the following:

receiving a paging message in the SFN, where the paging message is an SFN specific paging message or a cell/TRP layer specific paging message; or receiving a system message in the SFN, where the system message is an SFN specific system message or a cell/TRP layer specific system message.

Alternatively, when the user equipment UE is camp on SFN layer, at least one of the following operations may be performed:

Operation 1: Receive a paging message on the SFN layer. The paging message may be an SFN specific paging message SFN specific paging, or a cell/TRP layer specific paging message cell/TRP layer specific paging.

Operation 2: Receive a system message on the SFN layer. The system message may be an SFN specific system message SFN specific SISI, or a cell/TRP layer specific system message cell/TRP layer specific SI.

Optionally, based on any of the foregoing embodiments, in a case that the network is deployed with a high frequency range and a low frequency range, the SFN specific cell includes a cell within the low frequency range; and a cell or TRP in the SFN includes a cell within the high frequency range;

or, in a case that the network includes a satellite communication network, the SFN specific cell includes a high altitude platform station HAPS cell or a high orbit satellite cell, and a cell or TRP in the SFN includes a low orbit satellite cell or a cell covered by a ground base station.

Alternatively, FIG. 4 is a schematic diagram of an application scenario of a high frequency range and a low frequency range according to an embodiment of this application. As shown in FIG. 4, a low frequency (for example, FR1) cell has a larger coverage than a high frequency (for example, FR2) cell. When the user equipment UE moves within the coverage of FR1, the FR2 cells may be continuously changed, but the FR1 cell is not changed. When the user equipment UE initially activates an FR2 cell or hands over an FR2 cell, the user equipment UE needs to continuously measure signal quality of each beam. A relatively large number of beams may lead to an excessively long cell activation time or cell handover time. For example, when a particular condition is met, the measurement time may reach a level of seconds, as shown below:

$$8\ ms + 24*Trs + Tuncertainty\_MAC + TL1 - RSRP, measure + TL1 - RSRP, report + THARQ + TFineTiming.$$

The foregoing excessively long measurement time may also result in a relatively large power consumption of the UE.

Therefore, when the network is deployed with a high frequency range and a low frequency range, a cell/TRP corresponding to the low frequency range may be regarded as an SFN or super cell, and a cell/TRP corresponding to the high frequency layer may be regarded as a cell/TRP in an SFN/super cell.

Similarly, for a satellite communication satellite or HAPS (High Altitude Platform Station), a high orbit satellite cell HAPS/satellite cell may be regarded as an SFN or super cell, and a cell/TRP corresponding to a low orbit satellite within the coverage or another common cell/TRP within the coverage may be regarded as a cell/TRP in an SFN/super cell.

In the embodiments of this application, when user equipment UE camp on or connected to a single frequency network SFN cell group needs to establish a connection with a target cell, the user equipment UE directly obtains access-related information for establishing the connection with the target cell from a network-side device and then establishes the connection with the target cell. Compared with the prior art in which the user equipment UE is camp on a cell/TRP to initiate a random access or establish a connection, frequent cell measurements and cell handover of the user equipment UE are avoided, thereby effectively reducing the power consumption of the user equipment UE and reducing the network overhead.

FIG. 5 is a schematic flowchart of another connection establishment method according to an embodiment of this application. As shown in FIG. 5, the method includes the following steps:

Step 500: Send access-related information to user equipment UE camp on or connected to a single frequency network SFN cell group, where the access-related information is used for instructing the user equipment UE to establish a connection with a target cell; and the target cell is a cell/TRP layer specific cell or transmission reception point.

Alternatively, since user equipment UE is camp on a cell/TRP layer when initiating random access or connection establishment in the prior art, the user equipment UE is also on the cell/TRP layer when initiating RACH or connection establishment. The SFN layer cannot be effectively used for residence or connection establishment to achieve the purpose of saving power for the user equipment UE, and as a result the user equipment UE is quite power-consuming.

Therefore, in this embodiment, the user equipment UE may be camp on the single frequency network cell group when the user equipment UE is in an idle state Idle or Inactive state, and when the user equipment UE is about to enter a connected state or has accessed the SFN layer or is in a process of establishing a connection with the SFN layer, the access-related information is sent to the user equipment UE, so that the user equipment UE accesses the target cell.

Alternatively, when the user equipment UE is about to enter a connected state or has accessed the SFN layer or is in a process of establishing a connection with the SFN layer, the network-side device may send, to the user equipment UE, the access-related information for establishing the connection with the target cell. In this embodiment, the access-related information may be any information or combination capable of providing an access resource for the user equipment UE, such as a physical layer cell identity PCI of the target cell, a synchronization raster of the target cell, a reference signal of the target cell, and a random access RACH resource correlated with the reference signal of the target cell.

After obtaining the access-related information, the user equipment UE may establish a connection with the target cell based on the access-related information.

In this embodiment, the target cell may be a cell or a transmission reception point TRP within the SFN coverage, or may be a cell or a transmission reception point TRP outside the SFN coverage, which is not limited in this embodiment.

In the embodiments of this application, when user equipment UE camp on or connected to a single frequency network SFN cell group needs to establish a connection with a target cell, a network-side device sends, to the user equipment UE, access-related information for establishing the connection with the target cell. Compared with the prior art in which the user equipment UE is camp on a cell/TRP to initiate a random access or establish a connection, frequent cell measurements and cell handover of the user equipment UE are avoided, thereby effectively reducing the power consumption of the user equipment UE and reducing the network overhead.

Optionally, based on any of the foregoing embodiments, before or when the user equipment UE camp on the SFN cell group establishes the connection with the target cell, the access-related information includes at least one of the following:
- a physical layer cell identity PCI of the target cell;
- a synchronization raster of the target cell;
- a reference signal of the target cell; or
- a random access RACH resource correlated with a reference signal of the target cell.

Alternatively, in a case that the user equipment UE camp on the SFN layer is about to access the SFN layer but has not accessed, that is, when the user equipment UE camp on the SFN cell group establishes a connection with the target cell, the access-related information may be sent to the user equipment UE, so that the user equipment UE directly establishes the connection with the target cell.

Alternatively, before the user equipment UE camp on the SFN layer establishes a connection with the target cell, the network-side device may send the access-related information to the user equipment UE, so that the user equipment UE establishes the connection with the target cell based on the access-related information. The access-related information may include at least one of the following:
- a physical layer cell identity PCI of the target cell, namely, a cell/TRP layer specific PCI;
- a synchronization raster of the target cell, namely, a cell/TRP layer specific Sync raster;
- a reference signal of the target cell, which may be cell/TRP layer specific SSB related information, for example, an SSB number, an SMTC, or the like; or
- a random access RACH resource correlated with the reference signal of the target cell, for example, a preamble configuration, a random access occasion (Rach occasion, RO) resource, or a resource for randomly accessing another time domain, frequency domain, or code domain.

In this embodiment, the user equipment UE needs to perform a cell selection or reselection operation before initiating the random access. The user equipment UE initiates RACH random access or connection establishment on the selected/reselected target cell/TRP.

Optionally, based on any of the foregoing embodiments, the access-related information is indicated by at least one of the following:
- an SFN specific system information SI indication;
- a system information SI indication of the target cell; or
- a reference signal indication of the target cell.

Alternatively, when sending the access-related information to the user equipment UE, at least one of the following may be first sent: SFN specific system information SI, system information SI of the target cell, or a reference signal of the target cell, so that the user equipment UE obtains the access-related information based on at least one of the foregoing indications.

For example, reference information of the target cell may be first sent to the user equipment UE, so that the user equipment UE obtains a PCI of the target cell based on the reference signal of the target cell, further obtains system information SI of the target cell, and finally obtains a random access RACH resource associated with the reference signal of the target cell, and that the user equipment UE establishes the connection with the target cell based on the RACH resource.

For example, cell/TRP layer specific SI of the target cell may be first sent to the user equipment UE, so that the user equipment UE obtains an RACH resource associated with a cell/TRP layer specific SSB of the target cell.

Alternatively, in this embodiment, the system information SI of the SFN may indicate any one, any two, or all of three types of access-related information: a physical layer cell identity PCI of the target cell, namely, a cell/TRP layer specific PCI, a synchronization raster of the target cell, namely, a cell/TRP layer specific Sync raster, and a synchronization signal block SSB-related information of the target cell, namely, a cell/TRP layer specific SSB related information. It may be understood that in a case that the system information SI corresponding to the single frequency cell group indicates only part of the access-related information, access-related information that is not indicated can be obtained through blind detection by the user equipment UE.

In this embodiment, the cell/TRP layer specific SSB related information of the target cell may be, for example, an SSB number, an SMTC, or the like.

Optionally, based on any of the foregoing embodiments, the method further includes:
when or before the user equipment UE camp on the SFN cell group establishes the connection with the target cell, sending to the user equipment UE at least one of the following:
- a reference signal of the target cell; or
- a system information SI corresponding to the target cell.

Alternatively, in this embodiment, because the access-related information can be indicated by the system information SI of the target cell or the reference signal of the target cell, the network-side device may send the system information SI indication of the target cell or the reference signal of the target cell to the user equipment UE that is about to establish a connection with the target cell or before the connection is established, so that the user equipment UE obtains the access-related information establishes the connection with the target cell.

Optionally, based on any of the foregoing embodiments, in a process during which the user equipment UE camp on the SFN cell group establishes the connection with the SFN cell group, or after the user equipment UE establishes the connection with the SFN, the sending the access-related information includes:
sending a handover command or a reconfiguration indication message to the user equipment UE, where the handover command or the reconfiguration indication message is used for the user equipment UE to obtain the access-related information.

Alternatively, in the process during which the user equipment UE camp on the SFN layer establishes the connection with the SFN layer, or after the user equipment UE has accessed the SFN layer, the user equipment UE may access the target cell/TRP of the cell/TRP layer based on an indication of the network side.

Alternatively, in the process during which the user equipment UE camp on the SFN layer establishes the connection with the SFN layer, or after the user equipment UE has accessed the SFN layer, the network-side device may send to the user equipment UE a handover command or a reconfiguration indication message, which is used for instructing the user equipment UE to transfer to be connected to the target cell/TRP of the cell/TRP layer.

It may be understood that the handover command or the reconfiguration indication message includes access-related information for the user equipment UE to establish the connection with the target cell, for example, system information SI of the target cell or a random access RACH resource correlated with a reference signal of the target cell. The user equipment UE may then be connected to the target cell/TRP based on the access-related information.

In an implementation, the handover command or the reconfiguration indication message may be a synchronous reconfiguration (reconfiguration with sync or handover command or mobility control information). In other words, an indication message sent by the network-side device to the user equipment UE instructs the user equipment UE to perform a handover operation or to switch a cell.

Optionally, based on any of the foregoing embodiments, in a process during which the user equipment UE camp on the SFN cell group establishes the connection with the SFN cell group, the sending the access-related information includes:

sending a random access-related message to the user equipment UE, where the random access-related message carries the access-related information; and the random access-related message includes: a Message2 in a contention-free random access process, or a Message2 or a Message4 in a contention random access process, or a MessageB in a two-step random access RACH process.

Alternatively, in the process during which the user equipment UE camp on the SFN cell group establishes the connection with the SFN layer, when sending, to the user equipment UE, the random access-related information, the network-side device may add the access-related information, which is used for instructing the user equipment UE to transfer to be connected to the target cell/TRP of the cell/TRP layer during the process of establishing the connection with the SFN layer.

Alternatively, when accessing the SFN layer, the user equipment UE may initiate an RACH through an SFN specific RACH resource. After receiving the random access request from the user equipment UE, the network-side device may return random access-related information to the user equipment UE. The random access-related information carries a handover command or a reconfiguration indication message, where the handover command or the reconfiguration indication message includes access-related information, used for instructing the user equipment UE to transfer to be connected to the target cell/TRP of the cell/TRP layer. After receiving the handover command or the reconfiguration indication message, the user equipment UE transfers to be connected to the target cell/TRP of the cell/TRP layer to complete the connection establishment.

In this embodiment of this application, when user equipment UE camp on a single frequency network cell group needs to establish a connection with a target cell, a network-side device adds access-related information for the user equipment UE to establish the connection with the target cell to a random access-related message in a process of establishing a connection with an SFN layer, which further saves the power consumption of the user equipment UE and saves the network overhead while avoiding frequent cell measurements of the user equipment UE.

Optionally, based on any of the foregoing embodiments, after the user equipment UE establishes the connection with the SFN, the access-related information includes target data link information; and the target data link information is used for indicating that all or part of service data of the user equipment UE are sent and received through the target cell.

Alternatively, after the user equipment UE camp on the SFN layer has successfully accessed the SFN layer, in a case that there is a need for data transmission with the target cell, the network-side device may instruct the user equipment UE to send and receive all or part of the service data through the target cell.

Alternatively, when the user equipment UE camp on the SFN layer has successfully accessed the SFN layer, the network-side device may send, to the user equipment UE, the access-related information, which may be target data link information. After receiving the access-related information, the user equipment UE may send and receive all or part of the service data through the target cell based on the target data link information.

Optionally, based on any of the foregoing embodiments, in a case that the user equipment UE is camp on the SFN cell group, the method further includes at least one of the following:

sending a paging message to the user equipment UE camp on the SFN cell group, where the paging message is an SFN specific paging message or a cell/TRP layer specific paging message; or sending a system message to the user equipment UE camp on the SFN cell group, where the system message is an SFN specific system message or a cell/TRP layer specific system message.

Alternatively, when the user equipment UE is camp on SFN layer, at least one of the following operations may be performed:

Operation 1: Send a paging message to the user equipment UE camp on the SFN cell group. The paging message may be an SFN specific paging message SFN specific paging, or a cell/TRP layer specific paging message cell/TRP layer specific paging.

Operation 2: Send a system message to the user equipment UE camp on the SFN cell group. The system message may be an SFN specific system message SFN specific SISI, or a cell/TRP layer specific system message cell/TRP layer specific SI.

Optionally, based on any of the foregoing embodiments, in a case that the network is deployed with a high frequency range and a low frequency range, the SFN specific cell includes a cell within the low frequency range; and a cell or TRP in the SFN includes a cell within the high frequency range;

or, in a case that the network includes a satellite communication network, the SFN specific cell includes a high altitude platform station HAPS cell or a high orbit satellite cell, and a cell or TRP in the SFN includes a low orbit satellite cell or a cell covered by a ground base station.

Alternatively, when the network is deployed with a high frequency range and a low frequency range, a cell/TRP corresponding to the low frequency range may be regarded as an SFN or super cell, and a cell/TRP corresponding to the high frequency layer may be regarded as a cell/TRP in an SFN/super cell.

Similarly, for a satellite communication satellite or HAPS (High Altitude Platform Station), a high orbit satellite cell HAPS/satellite cell may be regarded as an SFN or super cell, and a cell/TRP corresponding to a low orbit satellite within the coverage or another common cell/TRP within the coverage may be regarded as a cell/TRP in an SFN/super cell.

In the embodiments of this application, when user equipment UE camp on or connected to a single frequency network SFN cell group needs to establish a connection with a target cell, a network-side device sends, to the user equipment UE, access-related information for establishing the connection with the target cell. Compared with the prior art in which the user equipment UE is camp on a cell/TRP to initiate a random access or establish a connection, frequent cell measurements and cell handover of the user equipment UE are avoided, thereby effectively reducing the power consumption of the user equipment UE and reducing the network overhead.

It should be noted that, an execution entity of the connection establishment method provided in this embodiment of this application may be a connection establishment apparatus, or a control module, in the connection establishment apparatus, for performing loading of the connection establishment method. In this embodiment of this application, the connection establishment method provided in this embodiment of this application is described by an example in which the connection establishment apparatus performs loading of the connection establishment method.

FIG. 6 is a schematic flowchart of still another connection establishment method according to an embodiment of this application. As shown in FIG. 6, the method includes the following steps:

Step 600: User equipment UE accesses an SFN layer.

Alternatively, the user equipment UE changes from a state of being camp on the single frequency cell group SFN layer to successfully accessing the single frequency cell group SFN layer, and in other words, establishes a connection with the SFN layer or a cell in the SFN layer.

Step 610: The user equipment UE receives a handover command or a reconfiguration indication message sent by a network-side device.

Alternatively, the network-side device may send the handover command or the reconfiguration indication message to the user equipment UE after the user equipment UE accesses the SFN layer.

After receiving the reconfiguration indication message, the terminal may obtain, based on the handover command or the reconfiguration indication message, access-related information for establishing a connection with a target cell, for example, system information SI of the target cell or a random access RACH resource correlated with a reference signal of the target cell.

Step 620: The user equipment UE establishes a connection with a target cell.

Alternatively, after obtaining the access-related information for establishing the connection with the target cell, the user equipment UE may initiate an RRC connection establishment or RACH process in the target cell based on the access-related information, to establish the connection with the target cell.

FIG. 7 is a schematic flowchart of yet still another connection establishment method according to an embodiment of this application. As shown in FIG. 7, the method includes the following steps:

Step 700: User equipment UE accesses an SFN layer.

Alternatively, the user equipment UE changes from a state of being camp on the SFN layer to a state of accessing the SFN layer, and in other words, is in a process of establishing a connection with the SFN layer.

Step 710: The user equipment UE receives access-related information sent by a network-side device.

Alternatively, the network-side device may send random access-related information to the user equipment UE in a process during which the user equipment UE accesses the SFN layer, and in other words, in a process during which the SFN layer initiates an RACH, and add a handover command or a reconfiguration indication message to the random access-related information.

After receiving the random access-related information and obtaining the handover command or the reconfiguration indication message carried therein, the user equipment UE may obtain, based on the handover command or the reconfiguration indication message, access-related information for establishing a connection with a target cell, for example, system information SI of the target cell or a random access RACH resource correlated with a reference signal of the target cell.

Alternatively, in a case that the process of random access to the SFN layer by the user equipment UE is a contention-free random access process, the random access-related information is Message2; in a case that the process of random access to the SFN layer by the user equipment UE is a contention random access process, the random access-related information is Message4; or in a case that the process of random access to the SFN layer by the user equipment UE is a two-step contention random access process RACH, the random access-related information is MessageB.

Step 720: The user equipment UE establishes a connection with a target cell.

Alternatively, after obtaining the access-related information for establishing the connection with the target cell, the user equipment UE may initiate an RRC connection establishment or RACH process in the target cell based on the access-related information, to establish the connection with the target cell.

Figure 8:
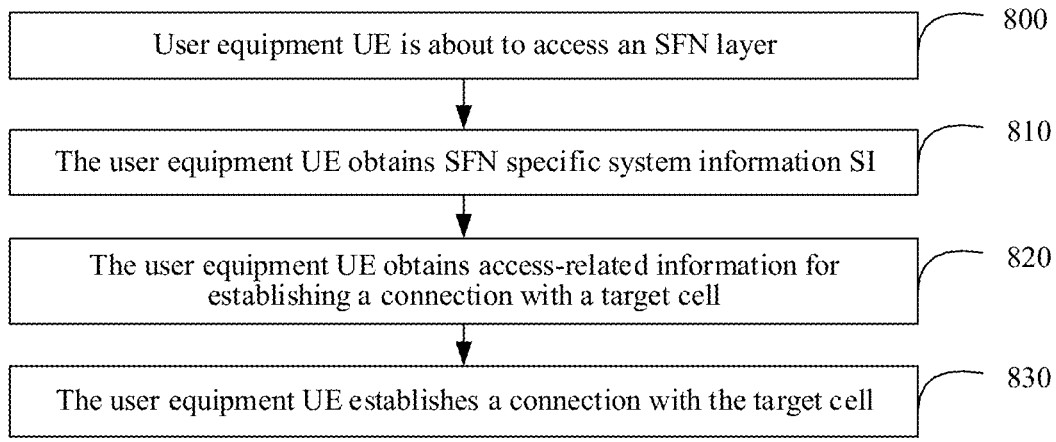
FIG. 8 is a schematic flowchart of yet still another connection establishment method according to an embodiment of this application.

FIG. 8 is a schematic flowchart of yet still another connection establishment method according to an embodiment of this application. As shown in FIG. 8, the method includes the following steps:

Step 800: User equipment UE is about to access an SFN layer.

Alternatively, the user equipment UE changes from a state of being camp on the SFN layer to a state of preparing to access the SFN layer, and in other words, the user equipment UE is in a state of being about to establish a connection with a cell in the single frequency cell group.

Step 810: The user equipment UE obtains SFN specific system information SI.

Alternatively, when the user equipment UE is about to access the SFN layer but has not accessed, that is, when the user equipment UE camp on the SFN cell group establishes a connection with the target cell, the network-side device may provide the user equipment UE with SFN specific system information SI, system information SI of the target cell, or a reference signal of the target cell for indicating access-related information. In this embodiment, a description is provided by an example of the SFN specific system information SI.

Step 820: The user equipment UE obtains access-related information for establishing a connection with a target cell.

After obtaining the SFN specific system information SI, the user equipment UE may obtain the access-related information based on the SFN specific system information SI.

The access-related information is at least one of the following:
  a physical layer cell identity PCI of the target cell;
  a synchronization raster of the target cell;
  a reference signal of the target cell; or
  a random access RACH resource correlated with a reference signal of the target cell.

Step 830: The user equipment UE establishes a connection with a target cell.

Alternatively, after obtaining the access-related information for establishing the connection with the target cell, the user equipment UE may initiate an RRC connection establishment or RACH process in the target cell based on the access-related information, to establish the connection with the target cell.

Figure 9:
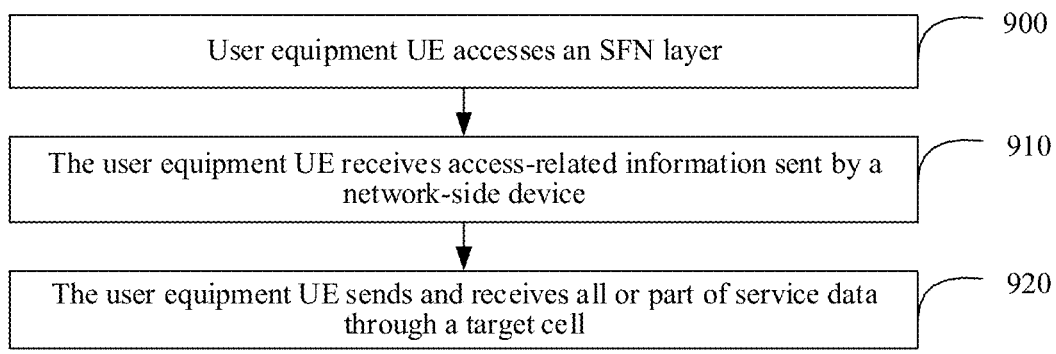
FIG. 9 is a schematic flowchart of yet still another connection establishment method according to an embodiment of this application.

FIG. 9 is a schematic flowchart of yet still another connection establishment method according to an embodiment of this application. As shown in FIG. 9, the method includes the following steps:

Step 900: User equipment UE accesses an SFN layer.

Alternatively, the user equipment UE changes from a state of being camp on the single frequency cell group SFN layer to successfully accessing the SFN layer, and in other words, establishes a connection with the SFN layer or a cell in the SFN layer.

Step 910: The user equipment UE receives access-related information sent by a network-side device.

Alternatively, the network-side device may send the access-related information to the user equipment UE after the user equipment UE accesses the SFN layer. In this embodiment, the access-related information may be target data link information.

After receiving the access-related information, the user equipment UE may obtain, based on the access-related information, the target data link information for data transmission to the target cell.

Step 920: The user equipment UE sends and receives all or part of service data through a target cell.

Alternatively, after obtaining the target data link information, the user equipment UE may send and receive all or part of the service data through the target cell.

It should be noted that, an execution entity of the connection establishment method provided in this embodiment of this application may be a connection establishment apparatus, or a control module, in the connection establishment apparatus, for performing the connection establishment method. In this embodiment of this application, the connection establishment apparatus provided in this embodiment of this application is described by an example in which the connection establishment apparatus performs the connection establishment method.

Figure 10:
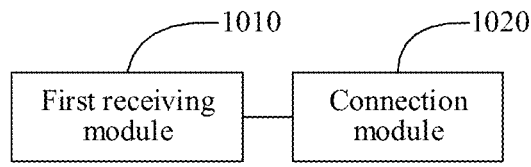
FIG. 10 is a schematic structural diagram of a connection establishment apparatus according to an embodiment of this application.

FIG. 10 is a schematic structural diagram of a connection establishment apparatus according to an embodiment of this application. As shown in FIG. 10, the apparatus includes: a first receiving module 1010 and a connection module 1020, where:

the first receiving module 1010 is configured to receive, by user equipment UE camp on or connected to a single frequency network SFN cell group, access-related information sent by a network-side device; and the connection module 1020 is configured to establish a connection with a target cell based on the access-related information, where the target cell is a cell/TRP layer specific cell or transmission reception point.

Alternatively, when the user equipment UE is camp on or connected to the single frequency network SFN cell group, the connection establishment apparatus obtains, through the first receiving module 1010, access-related information sent by the network-side device, and establishes a connection with the target cell through the connection module 1020 based on the access-related information.

In the embodiments of this application, when user equipment UE camp on or connected to a single frequency network SFN cell group needs to establish a connection with a target cell, the user equipment UE directly obtains access-related information for establishing the connection with the target cell from a network-side device and then establishes the connection with the target cell. Compared with the prior art in which the user equipment UE is camp on a cell/TRP to initiate a random access or establish a connection, frequent cell measurements and cell handover of the user equipment UE are avoided, thereby effectively reducing the power consumption of the user equipment UE and reducing the network overhead.

Optionally, based on any of the foregoing embodiments, before or when the user equipment UE camp on the SFN cell group establishes the connection with the target cell, the access-related information includes at least one of the following:

a physical layer cell identity PCI of the target cell;
a synchronization raster of the target cell;
a reference signal of the target cell; or
a random access RACH resource correlated with a reference signal of the target cell.

Optionally, based on any of the foregoing embodiments, the access-related information is indicated by at least one of the following:

an SFN specific system information SI indication;
a system information SI indication of the target cell; or
a reference signal indication of the target cell.

Optionally, based on any of the foregoing embodiments, the apparatus further includes:

a second receiving module, configured to: when or before the user equipment UE camp on the SFN cell group establishes the connection with the target cell, receive at least one of the following:
a reference signal of the target cell; or
a system information SI corresponding to the target cell.

Optionally, based on any of the foregoing embodiments, in a process during which the user equipment UE camp on the SFN cell group establishes the connection with the SFN cell group, or after the user equipment UE establishes the connection with the SFN, the receiving module is further configured to:

receive a handover command or a reconfiguration indication message sent by the network-side device and obtain the access-related information based on the handover command or the reconfiguration indication message.

Optionally, based on any of the foregoing embodiments, in a process during which the user equipment UE camp on the SFN cell group establishes the connection with the SFN cell group, the receiving module is further configured to:

receive a random access-related message sent by the network-side device, where the random access-related message carries the access-related information; and
the random access-related message includes: a Message2 in a contention-free random access process, or a Message2 or a Message4 in a contention random access process, or a MessageB in a two-step random access RACH process.

Optionally, based on any of the foregoing embodiments, the connection with the SFN is established based on a random access RACH resource associated with an SFN specific reference signal.

Optionally, based on any of the foregoing embodiments, the apparatus further includes:

an obtaining module, configured to: before the user equipment UE establishes the connection with the SFN, obtain the random access RACH resource from SFN specific system information SI or cell/TRP layer specific system information SI.

Optionally, based on any of the foregoing embodiments, the establishing the connection with the target cell includes: initiating an RRC connection establishment or RACH process in the target cell.

Optionally, based on any of the foregoing embodiments, after the user equipment UE establishes the connection with the SFN, the access-related information includes target data link information; and the connection module is further configured to: send and receive all or part of service data of the user equipment UE through the target cell based on the target data link information.

Optionally, based on any of the foregoing embodiments, in a case that the user equipment UE is camp on the SFN cell group, the apparatus further includes:

a handover module, configured to: when the user equipment UE switches between different cells/TRPs within an SFN coverage, not perform cell selection or reselection or not perform cell handover.

Optionally, based on any of the foregoing embodiments, the apparatus further includes:

a residing module, configured to: in a case that the user equipment UE is in an inactive state or an idle state, reside on the SFN, where the user equipment UE distinguishes a cell/TRP layer specific cell and an SFN specific cell based on at least one of the following:

a physical layer cell identity PCI; or a synchronization raster.

Optionally, based on any of the foregoing embodiments, in a case that the user equipment UE is camp on the SFN cell group, the apparatus further includes at least one of the following:

a third receiving module, configured to receive a paging message in the SFN, where the paging message is an SFN specific paging message or a cell/TRP layer specific paging message; or a fourth receiving module, configured to receive a system message in the SFN, where the system message is an SFN specific system message or a cell/TRP layer specific system message.

Optionally, based on any of the foregoing embodiments, in a case that the network is deployed with a high frequency range and a low frequency range, the SFN specific cell includes a cell within the low frequency range; and a cell or TRP in the SFN includes a cell within the high frequency range;

or, in a case that the network includes a satellite communication network, the SFN specific cell includes a high altitude platform station HAPS cell or a high orbit satellite cell, and a cell or TRP in the SFN includes a low orbit satellite cell or a cell covered by a ground base station.

In the embodiments of this application, when user equipment UE camp on or connected to a single frequency network SFN cell group needs to establish a connection with a target cell, the user equipment UE directly obtains access-related information for establishing the connection with the target cell from a network-side device and then establishes the connection with the target cell. Compared with the prior art in which the user equipment UE is camp on a cell/TRP to initiate a random access or establish a connection, frequent cell measurements and cell handover of the user equipment UE are avoided, thereby effectively reducing the power consumption of the user equipment UE and reducing the network overhead.

Figure 11:
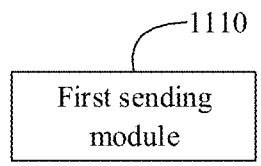
FIG. 11 is a schematic structural diagram of another connection establishment apparatus according to an embodiment of this application.

FIG. 11 is a schematic structural diagram of another connection establishment apparatus according to an embodiment of this application. As shown in FIG. 11, the apparatus includes: a first sending module 1110, where the first sending module 1110 is configured to send access-related information to user equipment UE camp on or connected to a single frequency network SFN cell group, where the access-related information is used for instructing the user equipment UE to establish a connection with a target cell; and the target cell is a cell/TRP layer specific cell or transmission reception point.

Alternatively, when the user equipment UE is camp on or connected to the single frequency network SFN cell group, the connection establishment apparatus sends, through the first sending module 1110, the access-related information to the user equipment UE, so that the user equipment UE establishes the connection with the target cell based on the access-related information.

In the embodiments of this application, when user equipment UE camp on or connected to a single frequency network SFN cell group needs to establish a connection with a target cell, a network-side device sends, to the user equipment UE, access-related information for establishing the connection with the target cell. Compared with the prior art in which the user equipment UE is camp on a cell/TRP to initiate a random access or establish a connection, frequent cell measurements and cell handover of the user equipment UE are avoided, thereby effectively reducing the power consumption of the user equipment UE and reducing the network overhead.

Optionally, based on any of the foregoing embodiments, before or when the user equipment UE camp on the SFN cell group establishes the connection with the target cell, the access-related information includes at least one of the following:

a physical layer cell identity PCI of the target cell;

a synchronization raster of the target cell;

a reference signal of the target cell; or a random access RACH resource correlated with a reference signal of the target cell.

Optionally, based on any of the foregoing embodiments, the access-related information is indicated by at least one of the following:

an SFN specific system information SI indication;

a system information SI indication of the target cell; or a reference signal indication of the target cell.

Optionally, based on any of the foregoing embodiments, the apparatus further includes:

a second sending module, configured to: when or before the user equipment UE camp on the SFN cell group establishes the connection with the target cell, send to the user equipment UE at least one of the following:

a reference signal of the target cell; or a system information SI corresponding to the target cell.

Optionally, based on any of the foregoing embodiments, in a process during which the user equipment UE camp on the SFN cell group establishes the connection with the SFN cell group, or after the user equipment UE establishes the connection with the SFN, the first sending module is further configured to:

send a handover command or a reconfiguration indication message to the user equipment UE, where the handover command or the reconfiguration indication message is used for the user equipment UE to obtain the access-related information.

Optionally, based on any of the foregoing embodiments, in a process during which the user equipment UE camp on the SFN cell group establishes the connection with the SFN cell group, the first sending module is further configured to:

send a random access-related message to the user equipment UE, where the random access-related message carries the access-related information; and the random access-related message includes: a Message2 in a contention-free random access process, or a Message2 or a Message4 in a contention random access process, or a MessageB in a two-step random access RACH process.

Optionally, based on any of the foregoing embodiments, after the user equipment UE establishes the connection with the SFN, the access-related information includes target data link information; and the target data link information is used for indicating that all or part of service data of the user equipment UE are sent and received through the target cell.

Optionally, based on any of the foregoing embodiments, in a case that the user equipment UE is camp on the SFN cell group, the apparatus further includes at least one of the following:

a third sending module, configured to send a paging message to the user equipment UE camp on the SFN cell group, where the paging message is an SFN specific paging message or a cell/TRP layer specific paging message; or a fourth sending module, configured to send a system message to the user equipment UE camp on the SFN cell group, where the system message is an SFN specific system message or a cell/TRP layer specific system message.

Optionally, based on any of the foregoing embodiments, in a case that the network is deployed with a high frequency range and a low frequency range, the SFN specific cell includes a cell within the low frequency range; and a cell or TRP in the SFN includes a cell within the high frequency range;

or, in a case that the network includes a satellite communication network, the SFN specific cell includes a high altitude platform station HAPS cell or a high orbit satellite cell, and a cell or TRP in the SFN includes a low orbit satellite cell or a cell covered by a ground base station.

In the embodiments of this application, when user equipment UE camp on or connected to a single frequency network SFN cell group needs to establish a connection with a target cell, a network-side device sends, to the user equipment UE, access-related information for establishing the connection with the target cell. Compared with the prior art in which the user equipment UE is camp on a cell/TRP to initiate a random access or establish a connection, frequent cell measurements and cell handover of the user equipment UE are avoided, thereby effectively reducing the power consumption of the user equipment UE and reducing the network overhead.

The connection establishment apparatus in this embodiment of this application may be an apparatus, or may be a component, an integrated circuit, or a chip in user equipment UE. The apparatus may be a mobile electronic device or a non-mobile electronic device. For example, the mobile electronic device may be a mobile phone, a tablet computer, a laptop, a palmtop computer, an in-vehicle electronic device, a wearable device, an ultra-mobile personal computer (UMPC), a netbook or a personal digital assistant (PDA), or the like. The non-mobile electronic device may be a server, a network attached storage (NAS), a personal computer (PC), television (TV), a teller machine, a self-service machine, or the like, which is not specifically limited in this embodiment of this application.

The connection establishment apparatus in this embodiment of this application may be an apparatus having an operating system. The operating system may be an Android operating system, may be an ios operating system, or may be another possible operating system, which is not specifically limited in this embodiment of this application.

The connection establishment apparatus provided in this embodiment of this application may implement various processes implemented by the connection establishment apparatus in the method embodiments of FIG. 3 to FIG. 9, which are not repeated herein in order to avoid duplication.

Figure 12:
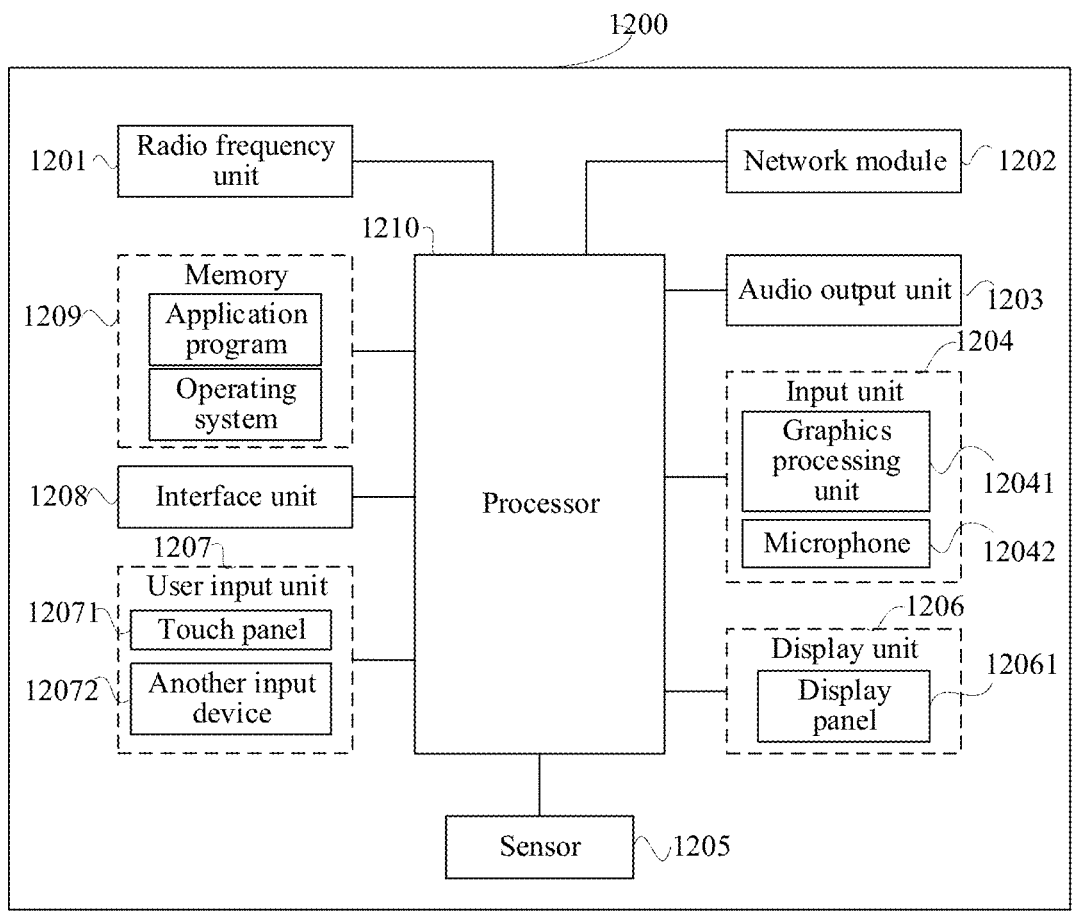
FIG. 12 is a schematic diagram of a hardware structure of user equipment UE for implementing an embodiment of this application.

FIG. 12 is a schematic diagram of a hardware structure of user equipment UE for implementing an embodiment of this application.

The user equipment UE 1200 includes, but is not limited to, components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

It may be understood by those skilled in the art that the user equipment UE 1200 may further include a power supply (for example, a battery) for supplying power to various components, and the power supply may be logically connected to the processor 1210 through a power management system, so as to implement functions such as managing charging or discharging, and power consumption management through the power management system. The structure of the user equipment UE shown in FIG. 12 does not constitute a limitation to the user equipment UE, and the user equipment UE may include more or fewer components than illustrated, or a combination of specific components, or arrangement of different components, which are not described herein again.

It should be understood that, in this embodiment of this application, the input unit 1204 may include a graphics processing unit (GPU) 12041 and a microphone 12042. The graphics processing unit 12041 processes image data of a still picture or a video obtained by an image capture apparatus (such as a camera) in a video capture mode or an image capture mode. The display unit 1206 may include a display panel 12061. The display panel 12061 may be configured in a form of a liquid crystal display, an organic light emitting diode, or the like. The user input unit 1207 includes a touch panel 12071 and another input device 12072. The touch panel 12071 is also referred to as a touchscreen. The touch panel 12071 may include a touch detection apparatus and a touch controller. The another input device 12072 may include, but is not limited to, a physical keyboard, a function key (such as a volume control key, a switch key, or the like), a trackball, a mouse, and an operating lever, which is not described in detail herein.

In this embodiment of this application, the radio frequency unit 1201 receives information from a network-side device and then sends the information to the processor 1210 for processing. Generally, the radio frequency unit 1201 includes, but is not limited to, an antenna, at least one amplifier, a transceiver, a coupler, a low noise amplifier, a duplexer, or the like.

The memory 1209 may be configured to store a software program or instructions, and various data. The memory 1209 may mainly include a storage program or instruction area and a storage data area, where the storage program or instruction area may store an operating system, an application program or instructions required for at least one function (for example, a sound playing function, an image playing function, or the like). In addition, the memory 1209 may include a high-speed random access memory, and may also include a non-volatile memory, where the non-volatile memory may be a Read-Only Memory (ROM), a programmable ROM (PROM), an erasable programmable read-only memory (EPROM), an electrically erasable programmable read-only memory (EEPROM), or a flash memory, for example, at least one disk storage device, flash storage device, or other non-volatile solid-state storage device.

The processor 1210 may include one or more processing units. Optionally, the processor 1210 may be integrated with an application processor and a modulation and demodulation processor, where the application processor mainly processes an operating system, a user interface, an application program, or instructions, and the like, and the modulation and demodulation processor mainly processes radio communications, for example, a base-band processor. It may be understood that the foregoing modulation and demodulation processor may also not be integrated into the processor 1210.

The processor 1210 is configured to establish a connection with a target cell based on the access-related information, where the target cell is a cell/TRP layer specific cell or transmission reception point.

The processor 1210 is further configured to: when or before the user equipment UE camp on the SFN cell group establishes the connection with the target cell, receive at least one of the following:
 a reference signal of the target cell; or
 a system information SI corresponding to the target cell.

Optionally, the processor 1210 is further configured to: in a process during which the user equipment UE camp on the SFN cell group establishes the connection with the SFN cell group, or after the user equipment UE establishes the connection with the SFN, receive a handover command or a reconfiguration indication message sent by the network-side device, and obtain the access-related information based on the handover command or the reconfiguration indication message.

Optionally, the processor 1210 is further configured to: in a process during which the user equipment UE camp on the SFN cell group establishes the connection with the SFN cell group, receive a random access-related message sent by the network-side device, where the random access-related message carries the access-related information; and
 the random access-related message includes: a Message2 in a contention-free random access process, or a Message2 or a Message4 in a contention random access process, or a MessageB in a two-step random access RACH process.

Optionally, the processor 1210 is further configured to: before the user equipment UE establishes the connection with the SFN, obtain the random access RACH resource from SFN specific system information SI or cell/TRP layer specific system information SI.

Optionally, the processor 1210 is further configured to initiate an RRC connection establishment or RACH process in the target cell.

Optionally, the processor 1210 is further configured to: after the user equipment UE establishes the connection with the SFN, send and receive all or part of service data of the user equipment UE through the target cell based on the target data link information, where the access-related information includes the target data link information.

Optionally, the processor 1210 is further configured to: in a case that the user equipment UE is camp on the SFN cell group, when the user equipment UE switches between different cells/TRPs within the SFN coverage, no cell selection or reselection or no cell handover is performed.

Optionally, the processor 1210 further configured to: in a case that the user equipment UE is in an inactive state or idle state, reside on the SFN, where the user equipment UE distinguishes a cell/TRP layer specific cell and an SFN specific cell based on at least one of the following:
 a physical layer cell identity PCI; or
 a synchronization raster.

Optionally, the processor 1210 is further configured to perform at least one of the following:
 receiving a paging message in the SFN, where the paging message is an SFN specific paging message or a cell/TRP layer specific paging message; or
 receiving a system message in the SFN, where the system message is an SFN specific system message or a cell/TRP layer specific system message.

In the embodiments of this application, when user equipment UE camp on or connected to a single frequency network SFN cell group needs to establish a connection with a target cell, the user equipment UE directly obtains access-related information for establishing the connection with the target cell from a network-side device and then establishes the connection with the target cell. Compared with the prior art in which the user equipment UE is camp on a cell/TRP to initiate a random access or establish a connection, frequent cell measurements and cell handover of the user equipment UE are avoided, thereby effectively reducing the power consumption of the user equipment UE and reducing the network overhead.

Figure 13:
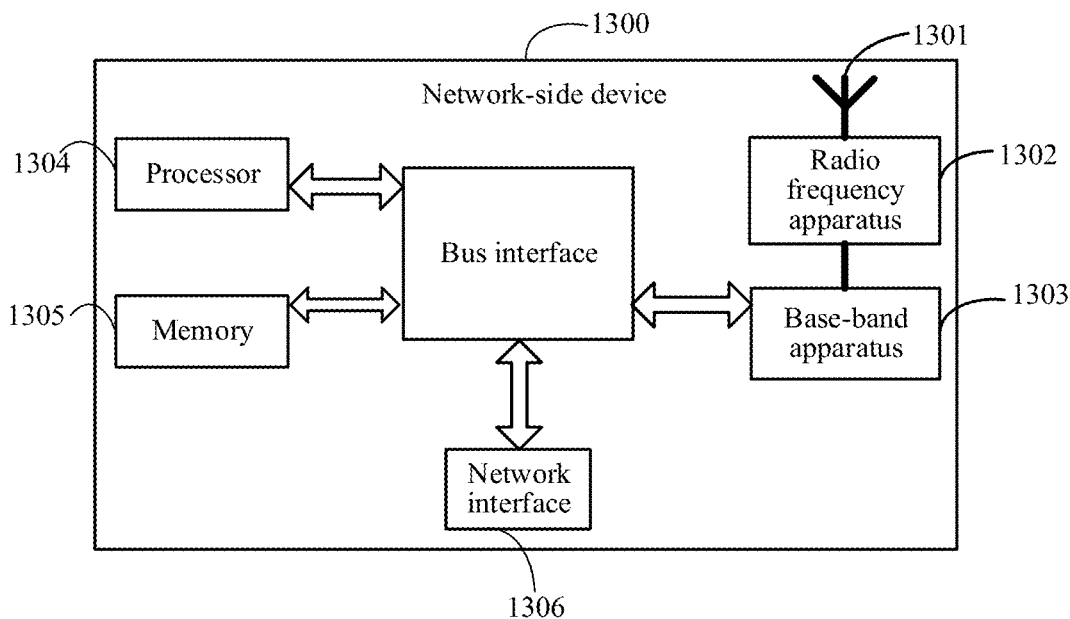
FIG. 13 is a schematic diagram of a hardware structure of a network-side device for implementing an embodiment of this application.

FIG. 13 is a schematic diagram of a hardware structure of a network-side device for implementing an embodiment of this application.

As shown in FIG. 13, the network-side device 1300 includes: an antenna 1301, a radio frequency apparatus 1302, and a base-band apparatus 1303. The antenna 1301 is connected to the radio frequency apparatus 1302. In an uplink direction, the radio frequency apparatus 1302 receives information through the antenna 1301, and sends the received information to the base-band apparatus 1303 for processing. In the downlink direction, the base-band apparatus 1303 processes the information to be sent and sends the information to the radio frequency apparatus 1302, and the radio frequency apparatus 1302 processes the received information and sends the processed information through the antenna 1301.

The frequency band processing apparatus may be located in the base-band apparatus 1303, the method performed by the network-side device in the foregoing embodiments may be implemented in the base-band apparatus 1303, and the base-band apparatus 1303 includes a processor 1304 and a memory 1305.

For example, the base-band apparatus 1303 may include at least one base-band board, and the base-band board is provided with a plurality of chips. As shown in FIG. 13, one of the chips is, for example, a processor 1304, and is connected to the memory 1305, to invoke a program in the memory 1305 to perform an operation of a network device in the foregoing method embodiment.

The base-band apparatus 1303 may also include a network interface 1306 for information exchange with the radio frequency apparatus 1302, and the interface is, for example, a common public radio interface (common public radio interface, CPRI for short).

Alternatively, the network-side device in this embodiment of this application further includes: instructions or a program stored on the memory 1305 and capable of being run on the processor 1304, where the processor 1304 invokes the instructions or the program in the memory 1305 to perform the method performed by the modules in FIG. 11, and the same technical effect is achieved, which are not repeated herein in order to avoid duplication.

In the embodiments of this application, when user equipment UE camp on or connected to a single frequency network SFN cell group needs to establish a connection with a target cell, a network-side device sends, to the user equipment UE, access-related information for establishing the connection with the target cell. Compared with the prior art in which the user equipment UE is camp on a cell/TRP to initiate a random access or establish a connection, frequent cell measurements and cell handover of the user equipment UE are avoided, thereby effectively reducing the power consumption of the user equipment UE and reducing the network overhead.

An embodiment of this application further provides a readable storage medium, storing a program or instruction. The program or instruction, when executed by a processor, implements all processes of the embodiments of the above connection establishment method, and can achieve the same technical effects. To avoid repetition, details are not described herein again.

The processor is the processor in the user equipment UE or network side device in the foregoing embodiments. The readable storage medium includes a computer-readable storage medium, for example, a computer read-only memory (ROM), a random access memory (RAM), a magnetic disk, or an optical disc.

An embodiment of this application further provides a chip, including: a processor and a communication interface, where the communication interface is coupled to the processor, and the processor is configured to run a program or instruction, to implement all processes of the embodiments of the above connection establishment method, and can achieve the same technical effects. To avoid repetition, details are not described herein again.

It should be understood that, the chips described in the embodiments of this application may also be referred to as a system-level chip, a system on a chip, a chip system, or a system on chip.

An embodiment of this application provides a program product. The program product stored in a non-volatile readable storage medium, when executed by a processor, implement all processes of the embodiments of the above connection establishment method, and can achieve the same technical effects. To avoid repetition, details are not described herein again.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that, the scope of the method and apparatus in the embodiments of this application is not limited to performing functions in the order shown or discussed, and it may further include performing the functions in a substantially simultaneous manner or in reverse order according to the functions involved. For example, the described method may be performed in a different order than described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and certainly, may alternatively be implemented by hardware, but in many cases, the former manner is a better implementation. Based on such an understanding, the technical solution of this application in essence, or a part that contributes to related technologies, may be embodied in the form of a software product. The computer software product may be stored in a storage medium (such as a ROM/RAM, a magnetic disk, and an optical disk), and includes multiple instructions to enable user equipment UE (which may be a mobile phone, a computer, a server, an air conditioner, or a network device, etc.) to execute the method described in various embodiments of this application.

The embodiments of this application are described above with reference to the accompanying drawings, but this application is not limited to the foregoing detailed description. The foregoing detailed description is only schematic but not restrictive. Under the motivation of this application, a person skilled in the art may make many forms without departing from the purpose of this application and the scopes of protection of the claims, and these all fall within the scope of protection of this application.

What is claimed is:

1. A connection establishment method, comprising:
receiving, by user equipment (UE) camp on or connected to a single frequency network (SFN) cell group, access-related information sent by a network-side device; and
establishing a connection with a target cell based on the access-related information, wherein
the target cell is cell or transmission reception point cell/TRP layer specific cell or transmission reception point;
wherein in a process during which the UE camp on the SFN cell group establishes the connection with the SFN cell group, or after the user equipment UE establishes the connection with the SFN, the receiving the access-related information sent by the network-side device comprises:
receiving a handover command or a reconfiguration indication message sent by the network-side device and
obtaining the access-related information based on the handover command or the reconfiguration indication message;
in a process during which the UE camp on the SFN cell group establishes the connection with the SFN cell group, the receiving the access-related information sent by the network-side device comprises:
receiving a random access-related message sent by the network-side device, wherein the random access-related message carries the access-related information; and
the random access-related message comprises:
a Message2 in a contention-free random-access procedure, or a Message2 or a Message4 in a contention random access procedure, or a MessageB in a two-step random access (RA) procedure.

2. The connection establishment method according to claim 1, wherein before or when the UE camp on the SFN cell group establishes the connection with the target cell, the access-related information comprises at least one of the following:
- a physical layer cell identity (PCI) of the target cell;
- a synchronization raster of the target cell;
- a reference signal of the target cell; or
- a random-access channel (RACH) resource correlated with a reference signal of the target cell,
- wherein the access-related information is indicated by at least one of the following:
- an SFN specific system information (SI) indication;
- a system information (SI) indication of the target cell; or
- a reference signal indication of the target cell.

3. The connection establishment method according to claim 1, the method further comprises:
- when or before the UE camp on the SFN cell group establishes the connection with the target cell, receiving at least one of the following:
- a reference signal of the target cell; or
- a system information (SI) corresponding to the target cell.

4. The connection establishment method according to claim 1, wherein after the UE establishes the connection with the SFN, the access-related information comprises target data link information; and
- the establishing the connection with the target cell based on the access-related information comprises: sending and receiving all or part of service data of the UE through the target cell based on the target data link information.

5. The connection establishment method according to claim 1, wherein in a case that the UE is camp on the SFN cell group, the method further comprises:
- when the UE switches between different cells/TRPs within an SFN coverage, not performing cell selection or reselection or not performing cell handover.

6. The connection establishment method according to claim 1, wherein the method further comprises:
- in a case that the UE is in an inactive state or an idle state, the UE is camp on the SFN cell group and distinguishes a cell/TRP layer specific cell and an SFN specific cell based on at least one of the following:
- a physical layer cell identity (PCI); or
- a synchronization raster.

7. The connection establishment method according to claim 1, wherein in a case that the UE is camp on the SFN cell group, the method further comprises at least one of the following:
- receiving a paging message in the SFN, wherein the paging message is an SFN specific paging message or a cell/TRP layer specific paging message; or
- receiving a system message in the SFN, wherein the system message is an SFN specific system message or a cell/TRP layer specific system message.

8. The connection establishment method according to claim 1, wherein in a case that the network is deployed with a high frequency range and a low frequency range, the SFN specific cell comprises a cell within the low frequency range; and a cell or TRP in the SFN comprises a cell within the high frequency range;
or,
in a case that the network comprises a satellite communication network, the SFN specific cell comprises a high-altitude platform station (HAPS) cell or a high orbit satellite cell, and a cell or TRP in the SFN comprises a low orbit satellite cell or a cell covered by a ground base station.

9. A connection establishment method, comprising:
- sending access-related information to user equipment (UE) camp on or connected to a single frequency network (SFN) cell group, wherein
- the access-related information is used for instructing the UE to establish a connection with a target cell; and
- the target cell is a cell/TRP layer specific cell or transmission reception point;
- wherein in a process during which the UE camp on the SFN cell group establishes the connection with the SFN cell group, or after the UE establishes the connection with the SFN, the sending the access-related information comprises:
- sending a handover command or a reconfiguration indication message to the UE, wherein the handover command or the reconfiguration indication message is used for the UE to obtain the access-related information;
- wherein in a process during which the UE camp on the SFN cell group establishes the connection with the SFN cell group, the sending access-related information comprises:
- sending a random access-related message to the UE, wherein the random access-related message carries the access-related information; and
- the random access-related message comprises:
- a Message2 in a contention-free random-access procedure, or a Message2 or a Message4 in a contention random access procedure, or a MessageB in a two-step random access (RA) procedure.

10. The connection establishment method according to claim 9, wherein before or when the UE camp on the SFN cell group establishes the connection with the target cell, the access-related information comprises at least one of the following:
- a physical layer cell identity (PCI) of the target cell;
- a synchronization raster of the target cell;
- a reference signal of the target cell; or
- a random-access channel (RACH) resource correlated with a reference signal of the target cell,
- wherein the access-related information is indicated by at least one of the following:
- an SFN specific system information (SI) indication;
- a system information (SI) indication of the target cell; or
- a reference signal indication of the target cell.

11. The connection establishment method according to claim 9, wherein the method further comprises:
- when or before the UE camp on the SFN cell group establishes the connection with the target cell, sending to the UE at least one of the following:
- a reference signal of the target cell; or
- a system information (SI) corresponding to the target cell.

12. The connection establishment method according to claim 9, wherein after the UE establishes the connection with the SFN, the access-related information comprises target data link information; and
- the target data link information is used for indicating that all or part of service data of the UE are sent and received through the target cell.

13. The connection establishment method according to claim 9, wherein in a case that the UE is camp on the SFN cell group, the method further comprises at least one of the following:

sending a paging message to the UE camp on the SFN cell group, wherein the paging message is an SFN specific paging message or a cell/TRP layer specific paging message; or sending a system message to the UE camp on the SFN cell group, wherein the system message is an SFN specific system message or a cell/TRP layer specific system message.

14. The connection establishment method according to claim 9, wherein in a case that the network is deployed with a high frequency range and a low frequency range, the SFN specific cell comprises a cell within the low frequency range; and a cell or TRP in the SFN comprises a cell within the high frequency range;

or, in a case that the network comprises a satellite communication network, the SFN specific cell comprises a high-altitude platform station (HAPS) cell or a high orbit satellite cell, and a cell or TRP in the SFN comprises a low orbit satellite cell or a cell covered by a ground base station.

15. A network-side device, comprising:

a processor; and a memory storing a program or instruction that is executable by the processor, wherein the program or instruction, when executed by the processor, causes the network-side device to perform the connection establishment method according to claim 9;

wherein in a process during which the UE camp on the SFN cell group establishes the connection with the SFN cell group, or after the UE establishes the connection with the SFN, the sending the access-related information comprises:

sending a handover command or a reconfiguration indication message to the UE, wherein the handover command or the reconfiguration indication message is used for the UE to obtain the access-related information;

wherein in a process during which the UE camp on the SFN cell group establishes the connection with the SFN cell group, the sending access-related information comprises:

sending a random access-related message to the UE, wherein the random access-related message carries the access-related information; and the random access-related message comprises:

a Message2 in a contention-free random-access procedure, or a Message2 or a Message4 in a contention random access procedure, or a MessageB in a two-step random access (RA) procedure.

16. A user equipment UE, comprising:

a processor; and a memory storing a program or instruction that is executable by the processor, wherein the program or instruction, when executed by the processor, causes the UE to:

receive access-related information sent by a network-side device; and establish a connection with a target cell based on the access-related information, wherein the target cell is cell or transmission reception point cell/TRP layer specific cell or transmission reception point;

wherein in a process during which the UE camp on the SFN cell group establishes the connection with the SFN cell group, or after the user equipment UE establishes the connection with the SFN, the receiving the access-related information sent by the network-side device comprises:

receiving a handover command or a reconfiguration indication message sent by the network-side device and obtaining the access-related information based on the handover command or the reconfiguration indication message;

in a process during which the UE camp on the SFN cell group establishes the connection with the SFN cell group, the receiving the access-related information sent by the network-side device comprises:

receiving a random access-related message sent by the network-side device, wherein the random access-related message carries the access-related information; and the random access-related message comprises:

a Message2 in a contention-free random-access procedure, or a Message2 or a Message4 in a contention random access procedure, or a MessageB in a two-step random access (RA) procedure.

* * * * *